July 7, 1970      H. W. DIETERT ET AL      3,519,252

METHOD OF AND STRUCTURE FOR CONDITIONING GRANULAR MATERIAL

Filed Sept. 8, 1966      3 Sheets-Sheet 1

INVENTORS
HARRY W. DIETERT
HOWARD L. JAMESON
BY
ATTORNEYS

July 7, 1970     H. W. DIETERT ET AL     3,519,252
METHOD OF AND STRUCTURE FOR CONDITIONING GRANULAR MATERIAL
Filed Sept. 8, 1966     3 Sheets-Sheet 2

*INVENTORS*
HARRY W. DIETERT
HOWARD L. JAMESON
BY Whittemore,
Hulbert & Belknap
ATTORNEYS

INVENTORS
HARRY W. DIETERT
HOWARD L. JAMESON
BY
ATTORNEYS

United States Patent Office 3,519,252
Patented July 7, 1970

3,519,252
METHOD OF AND STRUCTURE FOR CONDITIONING GRANULAR MATERIAL
Harry W. Dietert, Kerrville, Tex., and Howard L. Jameson, Livonia, Mich., assignors to Harry W. Dietert Co., Detroit, Mich., a corporation of Michigan
Filed Sept. 8, 1966, Ser. No. 577,985
Int. Cl. B28c *7/04*
U.S. Cl. 259—149            10 Claims

ABSTRACT OF THE DISCLOSURE

A method of conditioning granular material, such as foundry sand, comprising separately sensing the temperature of the granular material and separately adding water to the granular material in accordance with the temperature thereof, and separately sensing the temper of the granular material and separately adding water to the granular material in accordance with the temper thereof. The structure for performing the granular material conditioning method includes apparatus for continuously sensing at least one of the temperature and temper of the granular material and continuously adding water to the granular material in accordance with the sensed temperature or temper. Structure is also provided for adding water to the granular material in response to one of temperature or temper sensing in batches.

---

In the past it has been customary to sense the moldability of foundry sand or one of the characteristics of the foundry sand, such as moisture content, and add water in accordance with the sensed moldability or characteristic of the foundry sand to temper the foundry sand. Where temperature has been a problem, the temperature of the foundry sand has also been sensed and an integrated signal developed representative of the sensed moldability or moisture and the sensed temperature for controlling the addition of water through single means responsive to the integrated signal to meter cooling and tempering water to the foundry sand simultaneously.

Such methods of conditioning granular material and apparatus therefor are undesirable in that apparatus metering both cooling and tempering water to the foundry sand is required to operate over a greater range than separate apparatus metering only tempering water. With the large operating range required to meter both cooling and tempering water the sensitivity of the metering apparatus to the integrated signal is not as good as it would be if it were possible to use a smaller range of operation for the water metering apparatus. Further, as the quantity of water added to the granular material increases with a single metering apparatus, any overshooting of a desired quantity of metered water will be increased.

In addition, integrating equipment to integrate the temperature and moisture or moldability measurements is relatively complicated and therefore subject to error and expensive. Also, operator confusion is likely to result from the combined addition of cooling water and tempering water to granular material and a variation in one will almost always affect the other.

It is therefore one of the objects of the present invention to provide an improved method of and means for conditioning granular material.

Another object is to provide a method of and means for conditioning granular material by adding cooling water and tempering water to the granular material separately.

Another object is to provide a method of and means for conditioning granular material by adding water thereto in accordance with the temper of the granular material and the temperature thereof without integration of signals representative of the temper and temperature of the granular material.

Another object is to provide a method of and means for conditioning granular material with reduced tempering water flow through tempering water metering means to reduce overshooting of tempering water.

Another object is to provide a method of and means for conditioning granular material which is simple, economical and efficient.

Other objects and features of the invention will become apparent as the description proceeds, especially when taken in conjunction with the accompanying drawings, illustrating a preferred embodiment of the invention, wherein.

With particular reference to the figures of the drawings, a specific embodiment of the present invention will now be considered in detail.

Figure 1:
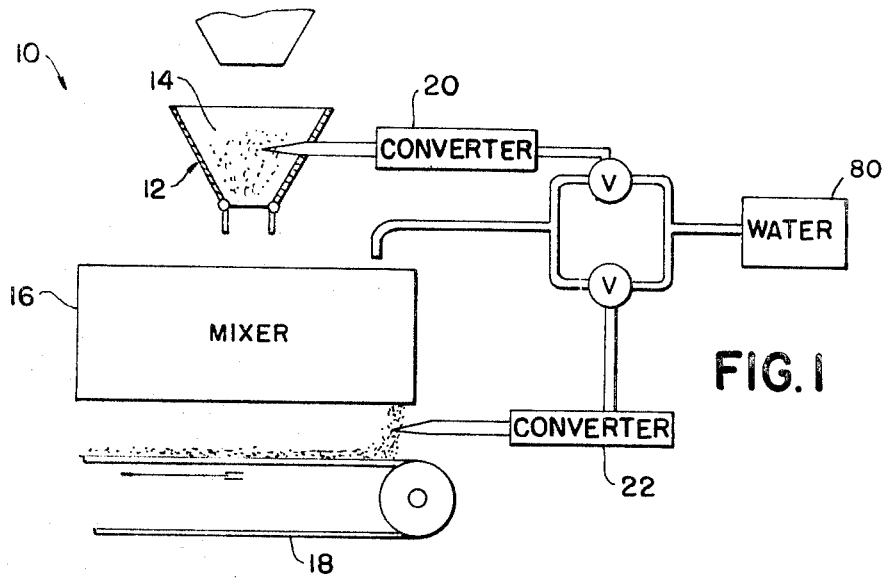
FIG. 1 is a diagrammatic illustration of granular material conditioning apparatus for performing the granular material conditioning method of the invention.

As illustrated in FIG. 1 the structure for conditioning granular material 10 includes a sand hopper 12 for storing foundry sand, a mixer 16 for mixing the foundry sand and water or other additives added thereto and conveying means 18 for transporting the conditioned foundry sand 14 away from the mixer 16. Further in accordance with the invention there is provided apparatus 20 for sensing the temperature of foundry sand in the hopper 12 and metering cooling water to the mixer 16 in accordance with the sensed temperature and separate apparatus 22 for sensing the temper of foundry sand as it leaves the mixer and metering water to the mixer 16 in accordance with the temper thereof.

Thus the water added to the mixer 16 is in two separate parts and the cooling water addition apparatus is not affected by the tempering water addition apparatus and the tempering water addition apparatus is not affecte by the cooling water addition apparatus. Further since the addition of cooling water and tempering water is separate there is little chance of operator confusion and the apparatus for metering the cooling and tempering water may be considerably simpler than previous apparatus required to integrate tempering water and cooling water signals.

In addition since the tempering water is added separately from the cooling water and cycled to be added after the cooling water, there is little tendency for large overshoots of tempering water since the quantity of tempering water may be maintained at a considerably lower value than if cooling water were mixed therewith.

Figure 5:
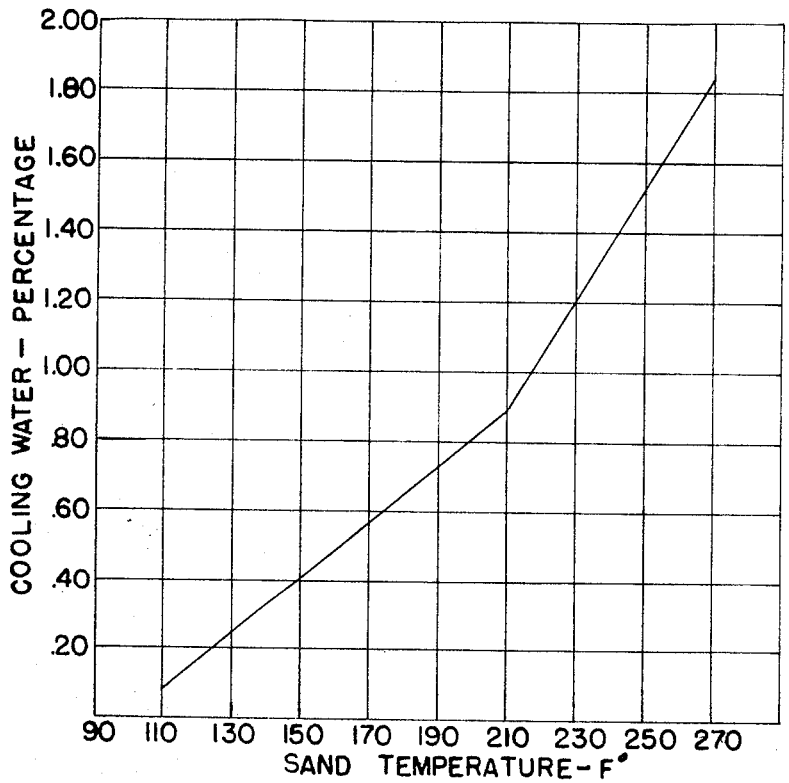
FIG. 5 is a graph showing cooling water percentage required in foundry sand over the temperature range illustrated.
Figure 6:
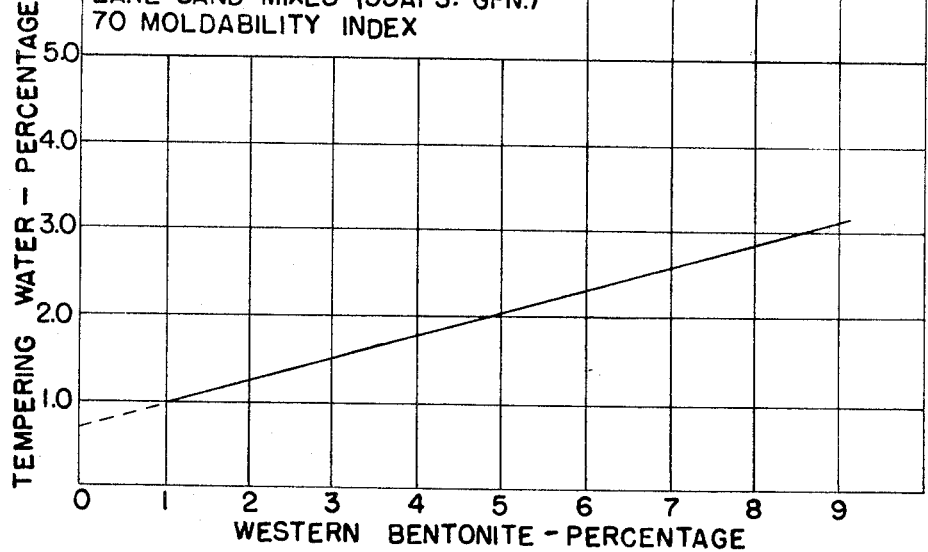
FIG. 6 is a graph illustrating the tempering water required for lake sand having a moldability index of seventy and the increase in the tempering water required with increase of Western Bentonite additive.

Specifically referring to FIGS. 5 and 6 for example, it will be seen from FIG. 5 that for a sand temperature of, for example, approximately 218 degrees one percent of cooling water is necessary. Thus, for one thousand pounds of foundry sand at 218 degrees, ten pounds of cooling water would be required. From FIG. 6 if the same sand has five percent Western Bentonite added thereto, approximately two percent tempering water is required therein. Thus twenty pounds of tempering water would be required.

Since the sand returning to the mixer 16 from previous foundry operations would not normally be bone dry but would have about fifty percent of the required tempering moisture therein, the tempering water required would then be in the neighborhood of ten pounds. Thus, the tempering water is just about half of the required tempering water and cooling water. Therefore, if separate metering apparatus is provided for the tempering, the tempering metering apparatus could be constructed to operate over a smaller range and the possible overshoot would be less.

Figure 2:
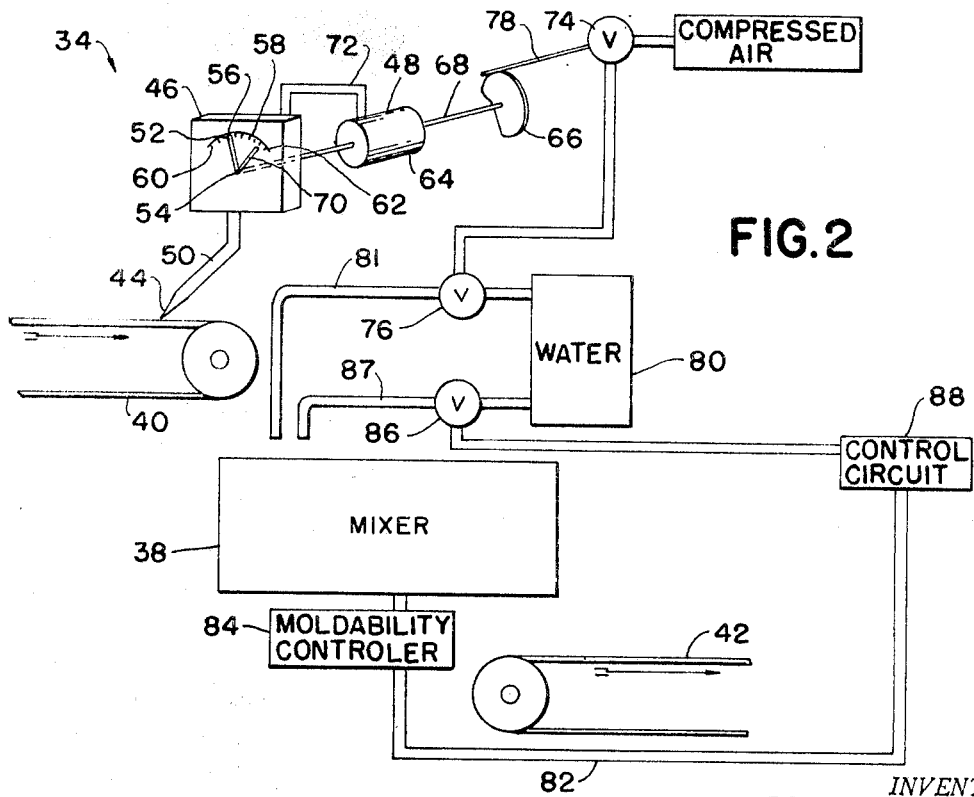
FIG. 2 is a diagrammatic illustration of apparatus for continuously conditioning granular material in accordance with the method of the invention similar to the apparatus of FIG. 1 and illustrating a specific structure for metering cooling water to the granular material in accordance with the temperature of the granular material.

Referring to the granular material conditioning apparatus 34 of FIG. 2, granular material is continuously fed to the mixer 38 over endless conveyor 40. Conditioned granular material is taken away from the mixer 38 by the conveyor 42.

The temperature sensing means 44 is a thermocouple inserted in the granular material on the conveyor 40. The thermocouple 44 produces an electric signal proportional to the temperature of the granular material on conveyor 40 which is passed to the meter 46 of the cooling water metering apparatus 48 over the conductors 50.

The cooling water metering apparatus 48 includes the meter 46 which is a commercial meter and may be procured from P.M.F. Electronics Company, Dayton, Ohio, and is sold as a "Non-physical Contact Meter." The meter 46 is such that the pointer 52 which pivots about the pivot pin 54 to swing the end 56 of the pointer 52 over the arcuate scale 58 is moved from the end 60 of the scale 58 toward the end 62 thereof a distance in accordance with the electric signal developed by the thermocouple 44.

The apparatus 48 for metering cooling water to the mixer 38 further includes the motor 64 for rotating the contour cam 66 about the axis of the rod 68 in accordance with the rotation of the motor 64 and the needle 70 of the meter 46 which is pivoted about the same pivot pin 54 as the needle 52 at one end thereof and which swings from the end 62 of the scale 58 toward the end 60 of the scale.

In accordance with the operation of the meter 46, when the two needles 52 and 70, needle 70 of which is the later to be moved, coincide, a signal is provided from the meter 46 over conductors 72 to shut the motor 64 off. When the motor 64 is turned off, the cam 66 is maintained in a predetermined position for ac ycle of operation of the meter 46.

The needle 52 is positioned cyclically so that the temperature of the granular material on the conveyor 40 is sampled periodically and the needle 58 is actuated immediately after the needle 52 in each cycle of operation thereof so that needle 58 follows the cyclical variations of the needle 52. Thus, the cam 56 is constantly repositioned with as little movement as possible to a location determined by the most recently sensed temperature of the granular material 36 of the conveyor 40.

The apparatus 48 for metering cooling water to the mixer 38, as shown in FIG. 2, further includes an air valve 74 connected to a source of air under pressure, such as for example twenty pounds air pressure. Valve 74 is operable to vary the pressure at the air pressure regulated fluid flow control valve 76 from three to five pounds per square inch in accordance with the position of the lever 78 determined by the contour of the cam 66 and the position thereof. Thus cooling water is continually metered from a water supply 80 through valve 76 to mixer 38 in accordance with the temperature of the granular material on the conveyor 40.

The separate apparatus 82 for providing tempering water in the mixer 38 includes a moldability controller 84, as for example set forth in U.S. Pats. Nos. 3,136,009 and 3,136,010, the air pressure regulated fluid flow control valve 86 in the conduit 87 from the water source 80 similar to conduit 81 and the control mechanism 88, as for example set forth in the patents indicated above for regulating the valve 86 in accordance with the moldability of granular material as it leaves the mixer 38 to provide tempering water as required in the mixer 38.

Figure 3:
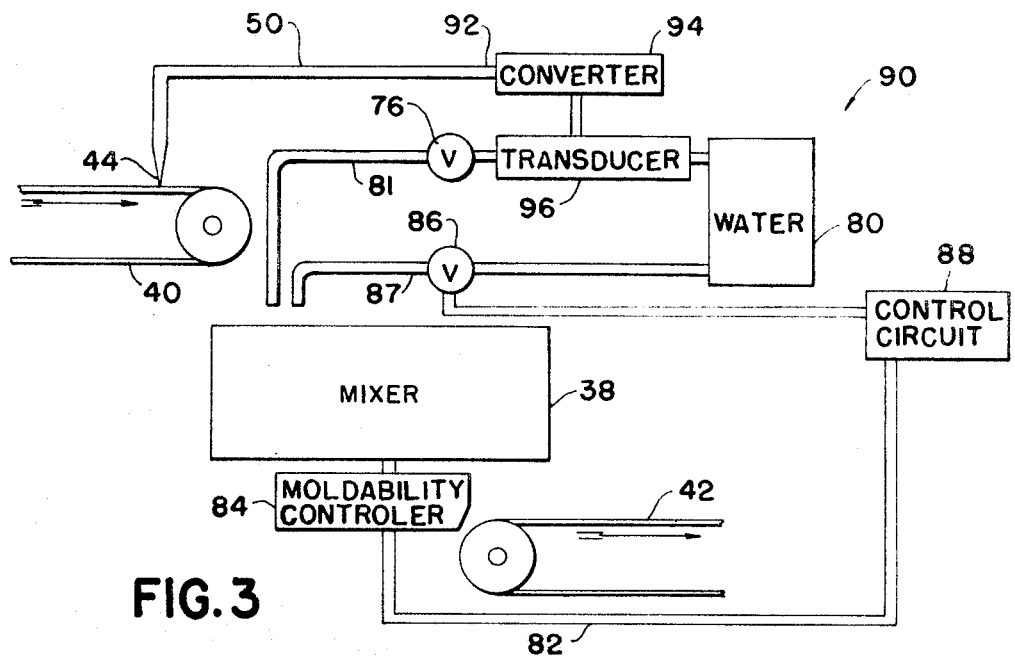
FIG. 3 is a diagrammatic illustration of a modification of the continuous granular material conditioning apparatus illustrated in FIG. 2 illustrating a different specific structure for metering cooling water to the granular material in accordance with the temperature of the granular material.

The structure 90 for conditioning granular material illustrated in FIG. 3 is similar in all respects to the structure 34 with the exception of the apparatus 92 for metering cooling water to the mixer. The apparatus 92 includes a converter 94 for converting a millivolt signal from the thermocouple 44 into a milliamp signal. The converter 92 is again a commercial instrument which may be purchased from Transmation, Inc., Rochester, N.Y. In the apparatus 92 for metering cooling water to the mixer 38, the milliamp signal is then fed through a milliamp to air pressure transducer 96 and the air pressure from the transducer 96 is used to regulate the air pressure fluid flow valve 76, as before.

The milliamp to air pressure transducer 96 is again a known article which is available from the Robertshaw Controls Company, Anaheim, Calif.

Figure 4:
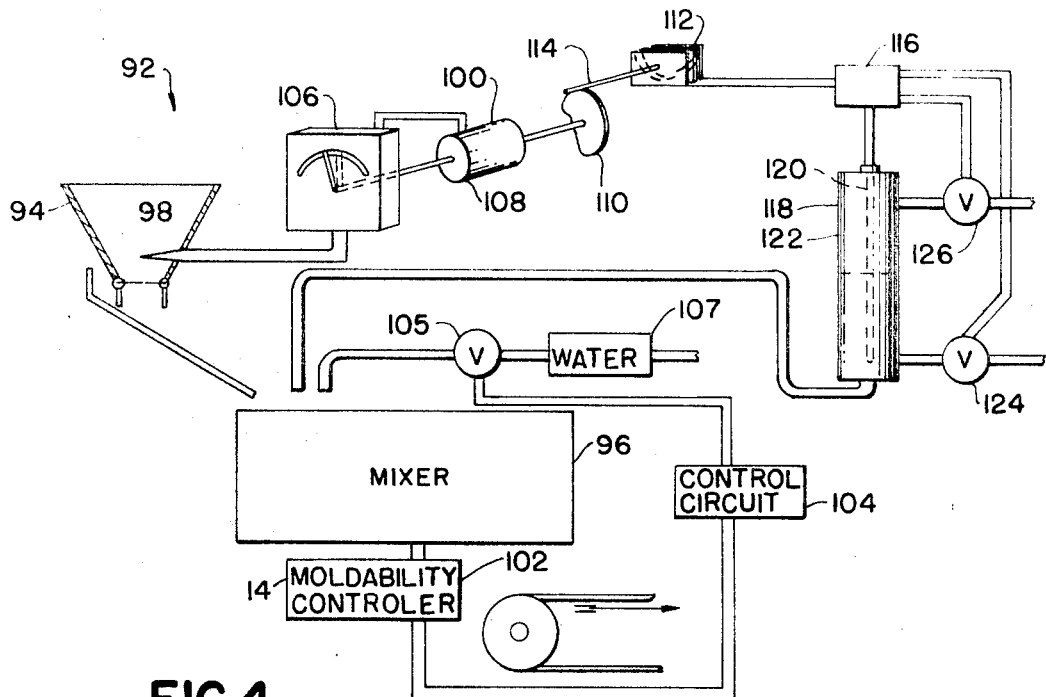
FIG. 4 is a diagrammatic illustration of apparatus for conditioning separate batches of granular material in accordance with the method of the invention.

The structure of FIG. 3 is also continuous granular material conditioning structure and with the apparatus 92 for metering cooling water into the mixer 38 of FIG. 4, the cyclic operation of the meter 46 is dispensed with. The structure of FIG. 2 however has the advantage that since different sands required different cooling water amounts for different temperatures, the cam 66 may be changed for each different sand readily, whereas the proper selection of milliamp for millivolt input in accordance with temperature for a particular granular material or similarly a non-linear tailored output for a particular milliamp input into the milliamp to air pressure transducer 96 is more difficult to accomplish.

The modified granular material conditioning structure 92 of FIG. 4 is of the batch type and includes the batch hopper 94, mixer 96, the thermocouple 98 for sensing the temperature of a batch of granular material in the hopper 94, apparatus 100 for metering cooling water to the mixer 96 in a batch depending on the temperature sensed by the thermocouple 98, the moldability sensing apparatus 102 for sensing the moldability of the batch of granular material in the mixer 96 and the control circuit 104 responsive to the moldability controller 102 for metering water to the mixer 96 in accordance with the moldability of the granular material therein.

The apparatus 100 for metering cooling water into the mixer 96 comprises a meter 106 similar to the meter 46, the motor 108 similar to the motor 64, and the contour cam 110 similar to contour cam 66. In the structure 92 the contour cam 110 controls the capacitance of the variable capacitor 112 in accordance with the position of the lever arm 114 which is set by the position of the cam 110. Capacitor 112 is in a bridge circuit 116 along with the batch water tank 118. The bridge circuit 116 is so constructed that when the capacitance provided by the water level in the tank 118 in conjunction with the insulated central probe 120 and the exterior 122 thereof is in a particular proportion to the capacitance of the capacitor 112, the bridge circuit 116 will cause the water valve 124 which previously has let water into the tank 122 to close and will cause the air valve 126 to open to pressure the tank 122 and discharge the water in the tank 122 in a batch into the mixer 96. This operation is repeated once for each cycle of the mixer 96.

The moldability sensing apparatus 102 and the control circuit 104 and valve 105 for feeding tempering water from source 107 into the mixer 96 is known, as for example, in the patents indicated above, and will not be considered in detail herein.

While one embodiment of the present invention has been disclosed in detail and modifications thereof suggested, it will be understood that other embodiments and modifications thereof are contemplated by the inventors. For example, the moldability sensing apparatus in the structures 36, 90 and 92 may be moisture sensing apparatus or means for electronically measuring the condition of the granular material in the mixer. Further the mixers 16, 38 and 96 may be replaced by other apparatus, such as a precooler or the like and the cooling water may be intentionally increased slightly to provide part of the tempering water to even further reduce the amount of tempering water required in accordance with the invention. It is the intention to include all embodiments and modifications as are defined by the appended claims within the scope of the invention.

What we claim as our invention is:

1. The method of conditioning granular material comprising sensing the temperature of the granular material, to determine the amount of cooling water required therein due to the temperature thereof, separately sensing the temper of the granular material to determine the amount of tempering water required to be added thereto to provide a desired temper thereof and separately metering the required cooling water and tempering water into the granular material individually in response to and in proportion to the sensed temperature and the sensed temper, respectively.

2. The method as set forth in claim 1 wherein the cooling water is metered in to the granular material first, followed by the tempering water.

3. The method as set forth in claim 1 wherein the granular material is sensed continuously and both cooling and tempering water are continuously metered into the granular material.

4. The method as set forth in claim 1 wherein the temperature and temper of the granular material is measured in separate batches and the cooling and tempering water are metered in to the granular material in separate batches.

5. Structure for conditioning granular material comprising mixing means for mixing granular material and water, separate sensing means for sensing the temperature and temper of granular material to be conditioned and sepaarte metering means operably connected to the sensing means and operably associated with the mixing means for separately metering cooling water and tempering water into the granular material to be mixed in response to and in proportion to the sensed temperature and temper respectively of the granular material.

6. Structure as set forth in claim 5, wherein the sensing means and metering means are operable to continuously sense the temperature and temper of the granular material to be conditioned and to continuously add cooling water and tempering water respectively to the granular material to be conditioned.

7. Structure as set forth in claim 6, wherein at least one of the sensing means comprises a thermocouple positioned in the granular material to be conditioned and the metering means comprises a meter including a first needle pivotable about a pivot pin at one end thereof over an arcuate scale in one direction in response toa signal from the sensing thermocouple, a motor, a contoured cam driven by said motor, a second needle driven by said motor and pivotable about the same pivot pin as the first needle over the arcuate scale from the other end of the arcuate scale, means operable to cut off the motor when the two needles coincide on the arcuate scale, a lever positioned by the contoured cam, an air valve controlled by the contoured cam, a water supply and an air regulated fluid flow valve for metering the water input to the granular material from the water supply in accordance with air pressure from the air valve responsive to the position of the lever.

8. Structure as set forth in claim 6, wherein at least one of the sensing means comprises a thermocouple positioned in the granular material to be conditioned and the metering mans comprises a millivolt to milliamp converter for changing the voltage signal produced by te thermocouple into a mililamp signal, a milliamp to air transducer for providing an air pressure proportional to the signal received from the millivolt to milliamp converter, a water supply source, a conduit from the water supply source to the granular material, and an air regulated fluid flow control valve in the conduit operable in response to the air pressure from the transducer.

9. Structure as set forth in claim 5, wherein at least one of the metering means is of the batch type.

10. Structure as set forth in claim 9, wherein the sensing means in conjunction with the one metering means is a thermocouple positioned in a batch hopper and the metering means comprises a meter, a needle on the meter pivoted about a pivot pin at one end thereof in accordance with the signal received from the thermocouple over an arcuate scale from one end thereof, a motor, a contoured cam driven by said motor, a second needle on said meter pivoted about the same pivot pin as the first needle from the other end of the arcuate scale and driven by the motor, means for shutting off the motor when the needles coincide on the scale, a bridge circuit, a capacitor in the bridge circuit forming one branch thereof operably associated with the contoured cam to provide capacitance in accordance with the position of the contoured cam, a water supply batch tank, means within the water supply tank forming a second branch of the bridge circuit, and means for filling the water supply tank until the capacitance thereof is in a predetermined relation to the capacitance of the capacitor set by the contoured cam, and means operable in response to the predtermined relation to empty the water in the water supply tank into the granular material in a batch.

References Cited

UNITED STATES PATENTS 1,205,323   11/1916   Cady _____ 106—38.9

FOREIGN PATENTS 703,019   2/1965   Canada.

ROBERT W. JENKINS, Primary Examiner